United States Patent [19]

Bogart et al.

[11] Patent Number: 6,009,162
[45] Date of Patent: *Dec. 28, 1999

[54] TELECOMMUNICATION FEATURE FOR EXCHANGE OF TRANSLATION INFORMATION BETWEEN A COMPUTER AND A TELECOMMUNICATION SWITCHING SYSTEM

[75] Inventors: Frank J. Bogart, Boulder, Colo.; Fatsing Chou, Menlo Park, Calif.; Thomas S. Fisher, Westminster; Paul L. Richman, Boulder, both of Colo.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/742,788

[22] Filed: Oct. 31, 1996

[51] Int. Cl.$^6$ ............................. H04M 3/00; H04M 3/42
[52] U.S. Cl. ..................... 379/265; 379/201; 379/93.17; 379/229
[58] Field of Search .................................. 379/265, 309, 379/266, 214, 218, 90.01, 93.01, 93.05, 93.09, 93.17, 229, 242, 201

[56] References Cited

U.S. PATENT DOCUMENTS

| | | | |
|---|---|---|---|
| 4,748,656 | 5/1988 | Gibbs et al. ................................. | 379/93 |
| 4,837,807 | 6/1989 | Szeto et al. ............................... | 379/210 |
| 4,899,373 | 2/1990 | Lee et al. .................................. | 379/201 |
| 5,201,045 | 4/1993 | Pflueger et al. .......................... | 379/201 |
| 5,239,460 | 8/1993 | LaRoche .................................... | 364/401 |
| 5,355,404 | 10/1994 | LeDuc et al. ............................. | 379/201 |
| 5,373,549 | 12/1994 | Bales et al. ................................. | 379/93 |
| 5,479,487 | 12/1995 | Hammond ................................. | 379/265 |
| 5,479,497 | 12/1995 | Kovarik .................................... | 379/265 |
| 5,485,511 | 1/1996 | Iglehart et al. ........................... | 379/201 |
| 5,490,211 | 2/1996 | Adams et al. ............................ | 379/309 |
| 5,499,291 | 3/1996 | Kepley ...................................... | 379/265 |
| 5,586,178 | 12/1996 | Koenig et al. ............................ | 379/309 |
| 5,724,418 | 3/1998 | Brady ........................................ | 379/266 |
| 5,751,795 | 5/1998 | Hassler et al. ............................ | 379/265 |
| 5,898,772 | 4/1999 | Connors et al. .......................... | 379/201 |

OTHER PUBLICATIONS

H. Newton, *A Microsoft Fantasy*, Computer Telephony, Jan./Feb. 1994, pp. 9, 10, 12, 15–16.

"Definity Communications System", Generic 3, Feature Description, Vol. 1, AT&T 555–230–204CI, Issue 2, Sep. 1995, pp. 3–117—3–124 and pp. 3–826—3–830.

*Primary Examiner*—Scott Wolinsky
*Assistant Examiner*—Benny Q. Tieu
*Attorney, Agent, or Firm*—John C. Moran

[57] ABSTRACT

Transferring administration information from a switching system to a computer telephony integration (CTI) terminal via a standard telecommunication link by the CTI terminal executing a feature on the switching system. Advantageously, the information is transferred from the switching system to the CTI terminal utilizing standard display messages as would be displayed on a voice terminal having a display unit. Further, the user of the CTI terminal can request only subsets of the system administration information. Using a voice terminal having a display unit, the user can access individual segments of the administration information.

20 Claims, 11 Drawing Sheets

| BEGIN [LISTNAME] [NUMBER] ENTRIES* |
|---|

FIG. 3

| PARAMETER<br>CHARACTER 1-4 | SEQUENCE#<br>CH 6-8 | DESCRIPTION<br>CHARACTER 10-40 |
|---|---|---|
| PPPP | NNN | DDDDDDDDDDDDDDDDDDDDDDDDDDDDDDD |
| SREL  SWITCH RELEASE | 1 | e.g.: SWITCH VERSION: G3V4 |
| CMST  CMS RELEASE | 2 | e.g.: CMS VERSION: R3V4 |
| PORT  NUMBER OF PORTS | 3 | e.g.: MAXIMUM PORTS: 1200 |

| BUTTON TYPE<br>CHARACTER 1-4 | BUTTON NUMBER<br>CHARACTER 6-8 | KEYWORD<br>CHAR 10-21 | DESCRIPTION<br>CHARACTER 23-40 |
|---|---|---|---|
| TTTT | NNN | KKKKKKKKKKKK | DDDDDDDDDDDDDDDDDD |
| TYPE  TERMINAL TYPE | (NONE) | (NONE) | TERMINAL TYPE CODE, e.g.: 602A |
| PRIN  LINE APPEARANCE | 1-999 | CALL-APPR OR BRDG-APPR | EXT NUMBER, e.g.: 5833 |
| LINE  FEATURE ON LINE BTN | 1-999 | FEAT CODE, e.g.: cfwd-bsyda | INFO |
| DISP  FEATURE ON DISPLAY BTN | 1-999 | FEAT CODE, e.g.: cfwd-bsyda | INFO |
| FEAT  FEATURE | 1-999 | FEAT CODE, e.g.: abrv-dial | INFO, e.g.: 4233 |

FIG. 5

| DIAL ACCESS CODE<br>CHARACTER 1-4 | SEQUENCE#<br>CHAR 6-8 | DESCRIPTION<br>CHARACTER 10-40 |
|---|---|---|
| CCCC | NNN | DDDDDDDDDDDDDDDDDDDDDDDDDDDDDDD |
| FAC, e.g.: *33 | 1 | FEATURE NAME, e.g.: CALL FORWARD*ALL |

| CURRENT DISPLAY | NEXT DISPLAY | |
|---|---|---|
| | FORWARD SELECTION | BACKWARD SELECTION |
| 1904 — LIST HEADER | NEXT Nth ENTRY | PREVIOUS LIST HEADER |
| 1906 — FIRST ENTRY | NEXT Nth ENTRY | LIST HEADER |
| 1907 — WITHIN TOP N | NEXT Nth ENTRY | FIRST ENTRY |
| 1908 — MID-TABLE | NEXT Nth ENTRY | PREVIOUS Nth ENTRY |
| 1909 — WITHIN BOTTOM N | LAST ENTRY | PREVIOUS Nth ENTRY |
| 1911 — LAST ENTRY | NO MORE | PREVIOUS Nth ENTRY |
| 1910 — NO MORE | NEXT LIST HEADER | PREVIOUS Nth ENTRY |

(columns labeled 1901, 1902, 1903)

TELECOMMUNICATION FEATURE FOR EXCHANGE OF TRANSLATION INFORMATION BETWEEN A COMPUTER AND A TELECOMMUNICATION SWITCHING SYSTEM

TECHNICAL FIELD

This invention relates to telephone switching systems.

BACKGROUND OF THE INVENTION

In the last decade or so, computer telephony integration (CTI) has come to be employed with switching systems. A CTI terminal is a combination of a personal computer (PC) with an attached telephone. The PC is controlled by an application program. This application program emulates a voice terminal used in call centers such as a Callmaster or Callmaster II voice terminals. In addition to emulating a normal call center voice terminal, the PC application allows additional functions to be performed. The PC is interconnected to the switching system utilizing normal telephone communication links. The switching system is programmed to consider the CTI terminal as an ordinary call center voice terminal. This means that the switching system is administered to provide telecommunication features based on feature access codes, telecommunication functions based on terminal button assignments and system parameters as well as display formats which would be displayed on the display of a voice terminal. In the prior art, this information must be administered on the PC controlling these CTI terminal manually by going from PC to PC. This procedure is particularly error prone since the information must first be retrieved for each of the CTI terminals from the switching system and then manually transferred to the CTI terminals. Clearly, there exists a need in the art to provide a mechanism for the automatic transfer of this system administration data from the switching system to the PCs within the CTI terminals.

Computer telephony integration has been especially used in call centers. Call centers are systems that enable a group of agents to serve incoming and/or outgoing calls, with the calls being distributed and connected to whichever of the agents happen to be available at the time of the call. The call-distribution function commonly referred to as automatic call distribution (ACD) is generally implemented in software that executes either in a stored program controlled switching system, such as a private branch exchange (PBX), that effects the call connection between agent telephones and external telephone lines, or in an adjunct processor of the switching system.

SUMMARY OF THE INVENTION

This invention is directed to solving these and other problems and disadvantages of the prior art. In accordance with the invention, administration information is transferred from a switching system to a CTI terminal via a standard telecommunication link by the CTI terminal executing a feature on the switching system. Advantageously, the information is transferred from the switching system to the CTI terminal utilizing standard display messages as would be displayed on a voice terminal having a display unit. Further, the user of the CTI terminal can request only subsets of the system administration information. Using a voice terminal having a display unit, a user can inspect individual segments of the administration information.

These and other advantages and features of the invention will become more apparent from the following description of an illustrated embodiment of the invention taken together with the drawing.

DETAILED DESCRIPTION

Figure 1:
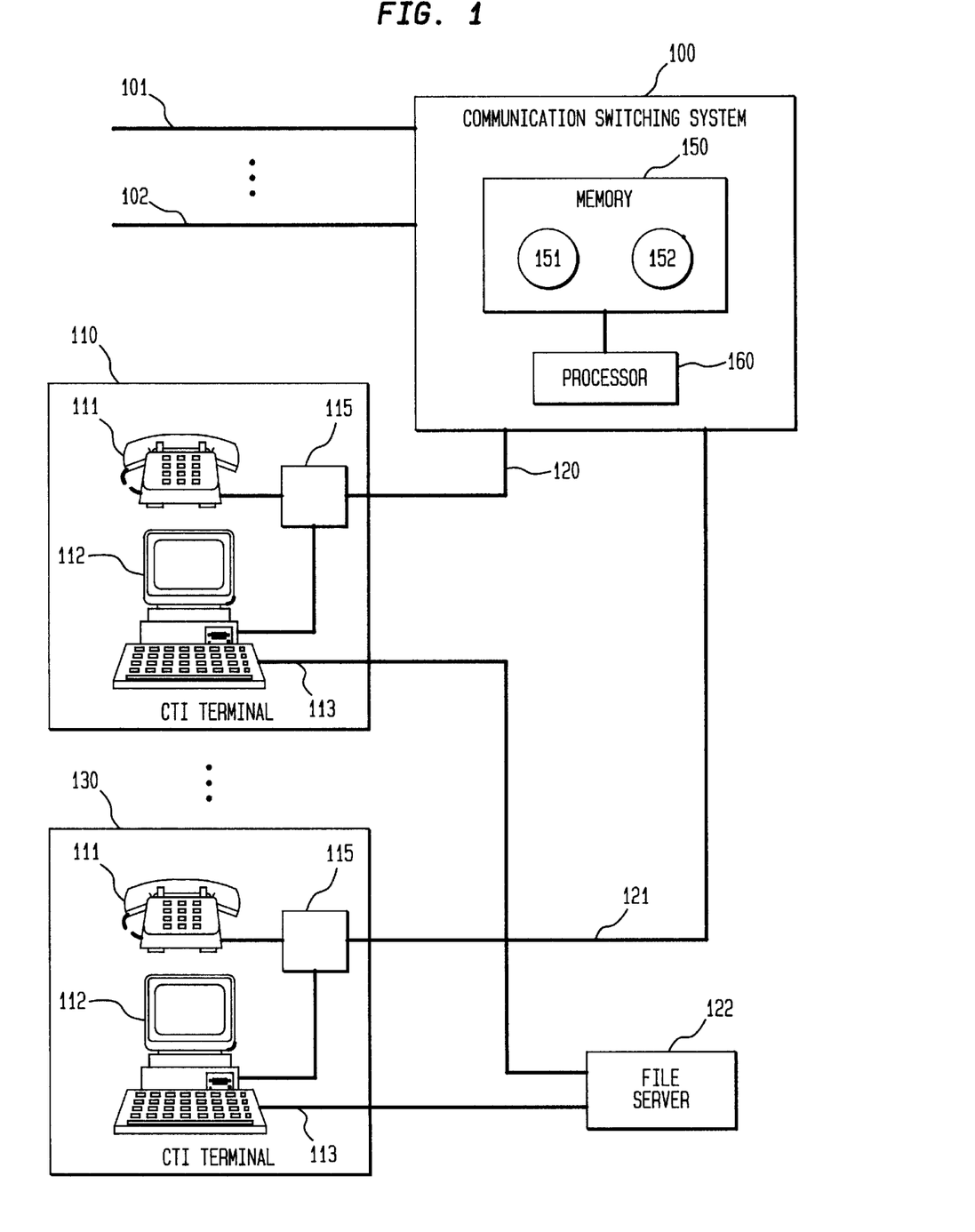
FIG. 1 is block diagram of a telecommunication system that embodies the invention.

FIG. 1 illustrates, in block diagram form, a telecommunication system which may be a call center or a private telephone system. Communication switching system 100 is interconnected to the public telephone system via trunks 101 through 102. Communication switching system interconnects and provides various communication features to computer telephone terminals 10 through 130. In a call center, CTI terminals 110 and 130 are utilized by agents to provide call center service to calls being received on trunks 101 through 102. Each CTI terminal emulates a conventional terminal such as the Lucent Technologies' Callmaster II terminal providing the features of that terminal plus additional functions. CTI terminal 110 comprises data terminal 112 which advantageously is a personal computer, and conventional telephone 111. Data terminal 112 is connected to the same communication link as telephone 111 by interface 115, as taught by U.S. Pat. No. 4,748,656. Illustratively, interface 115 is the AT&T passageway device or the AT&T PC/PBX connection device.

For each of CTI terminals 110 through 130, processor 160 stores in memory 150 administration information that defines the operation of the CTI terminal. This administration information is stored in what are commonly called administration tables as if the CTI terminals were display telephones. The stored administration information is grouped into what is referred to as items or lists. In the examples used in the present embodiments, the stored administration information advantageously consists of four items: (1) system parameters, (2) switch feature access codes, (3) terminal button assignments, and (4) VuStat display formats. One skilled in the art could readily envision other items or lists of administration information. In accordance with the invention, communication switching system has a new feature access code which when activated by a CTI terminal causes the administration information for the previous four items to be selectively downloaded by processor 160 over the communication link interconnecting the CTI terminal to communication switching system 100. This information is transmitted to the CTI terminal in the form of standard display messages as utilized by a display telephone to display information to a user. Advantageously, the above four information items can be individually selected so that only one is transmitted to the CTI terminal or all of the information items can be transmitted at once.

Consider the following example that illustrates the invention. To extract the administration information from communication switching system 100, an application running in data terminal 112 of CTI terminal 110 selects an idle line appearance on communication link 120 and dials the feature access code designating that the administration information is to be downloaded. Processor 160 is responsive to the dialed feature access code to actuate download code 152. After dialing the feature access code, the application dials the list number of the administration information to be received. For example, to obtain the switch feature access codes, the application program dials a "2". The application then hangs up to start the downloading from communication switching system 100. Download code 152 is responsive to the selected list number to transmit information defining the switch feature access codes as a series of display messages. In this manner, data terminal 112 obtains the exact current switch feature access codes assigned to CTI terminal 110 from communications switching system 100.

Figure 2:
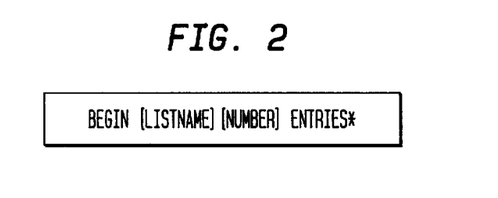
FIGS. 2–10 illustrate messages that are transmitted by a communication switching system to a CTI terminal.
Figure 7:
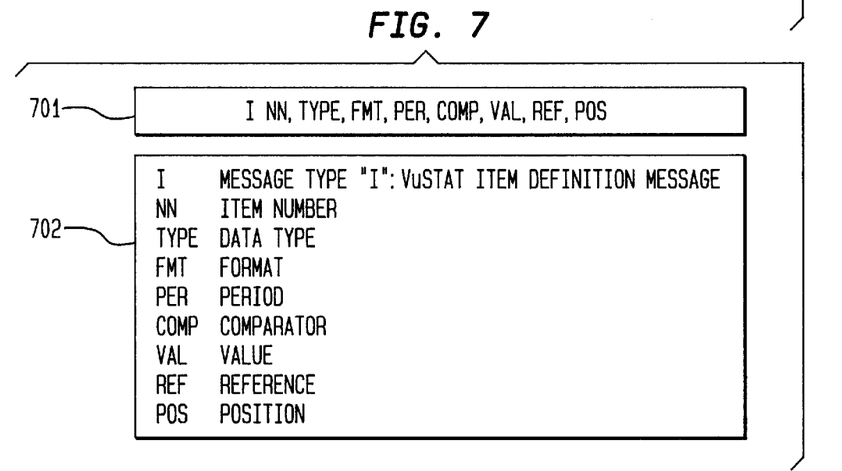
Figure 8:
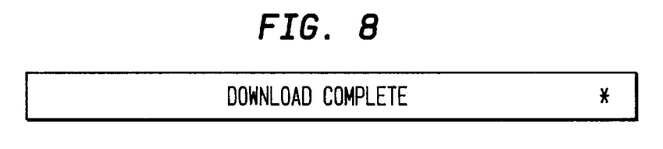
Figure 9:
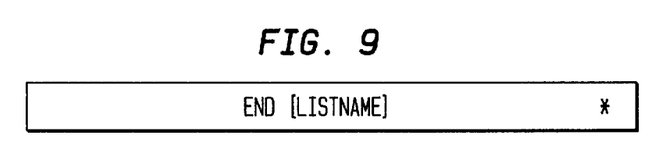
Figure 10:
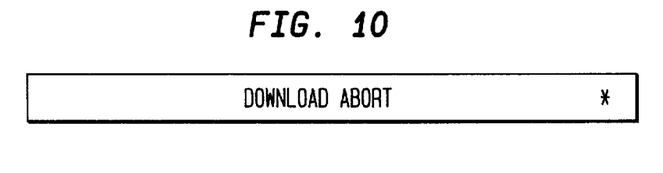

FIGS. 2 through 10 illustrate the formats of the display messages that are transmitted from communication switching system 100 to a CTI terminal. Each format has forty textual characters. The messages indicating the start, completion or abortion of an operation have the last character as an asterisk such as illustrated in FIGS. 2, 8, 9, and 10. FIG. 2 illustrates the message that is transmitted at the start of the transmission of a list. In FIG. 2, the number of entries in the list to be transmitted is inserted in place of "[number]" and the selected list's name is inserted in place of "[list name]". After transmission of the beginning terminal message of FIG. 2 for each list, messages having the formats illustrated in FIGS. 3 through 7 are used for transmitting the contents of the list. When a list has been transmitted, the message of FIG. 9 is sent indicating the end of the list. When all lists requested by the CTI terminal have been transmitted by communication switching system 100, the latter system transmits the download complete message illustrated in FIG. 8. If the transmission of information is interrupted by communication switching system 100, the latter system transmits the download abort message of FIG. 10.

Figure 3:
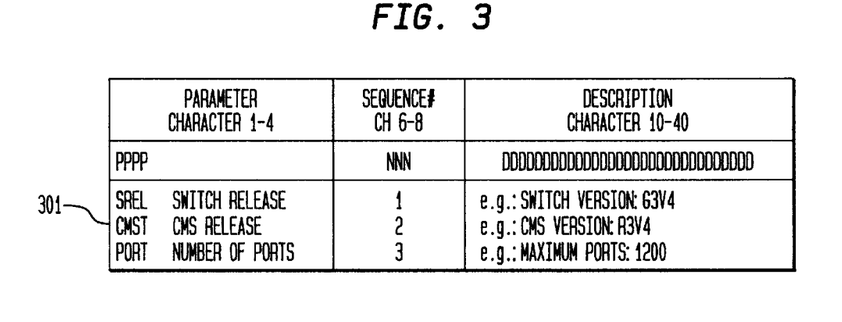
Figure 4:
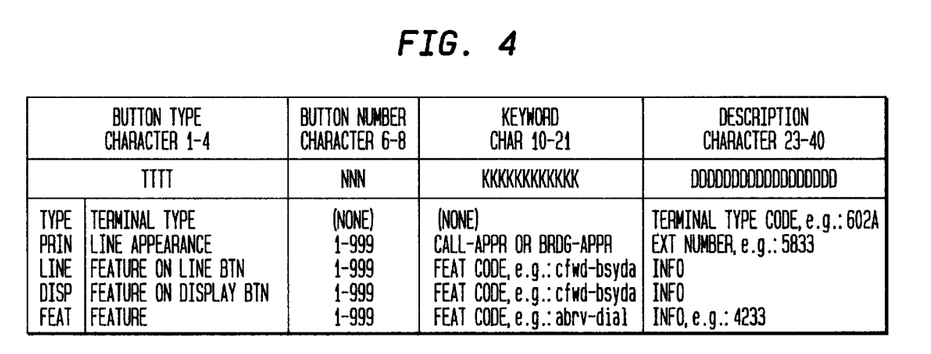
Figure 5:
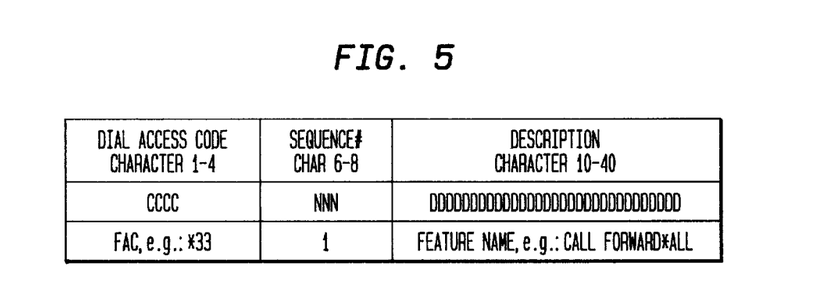
Figure 6:
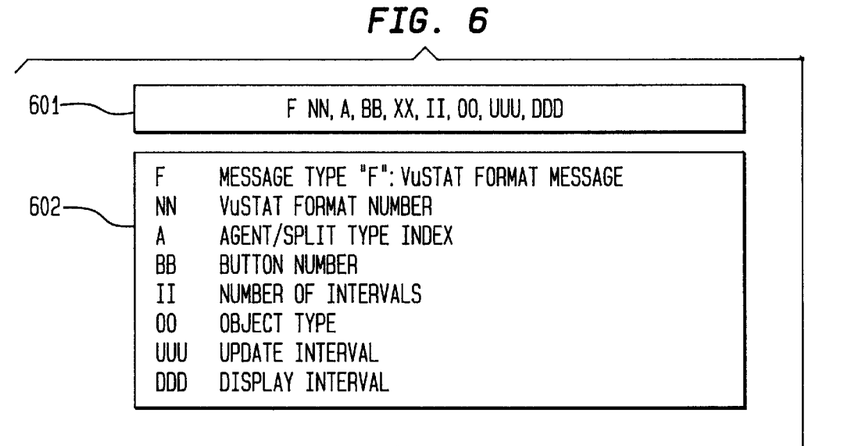

FIG. 3 illustrates the format in which the system parameters are transmitted. For example, line 301 illustrates the version number of the switch software of communication switching system 101. FIG. 4 illustrates the format utilized to send terminal button assignments information from communication switching system 100 to a CTI terminal. FIG. 5 illustrates the format of the message utilized to send the feature access codes (FAC). FIG. 6 illustrates in item 601 the format of the general VuStat format information display message. Item 602 defines the abbreviations utilized in item 601. FIG. 7 illustrates the format of the message utilized to send VuStat format data item descriptions, and item 702 defines the abbreviations of item 701.

Figure 11:
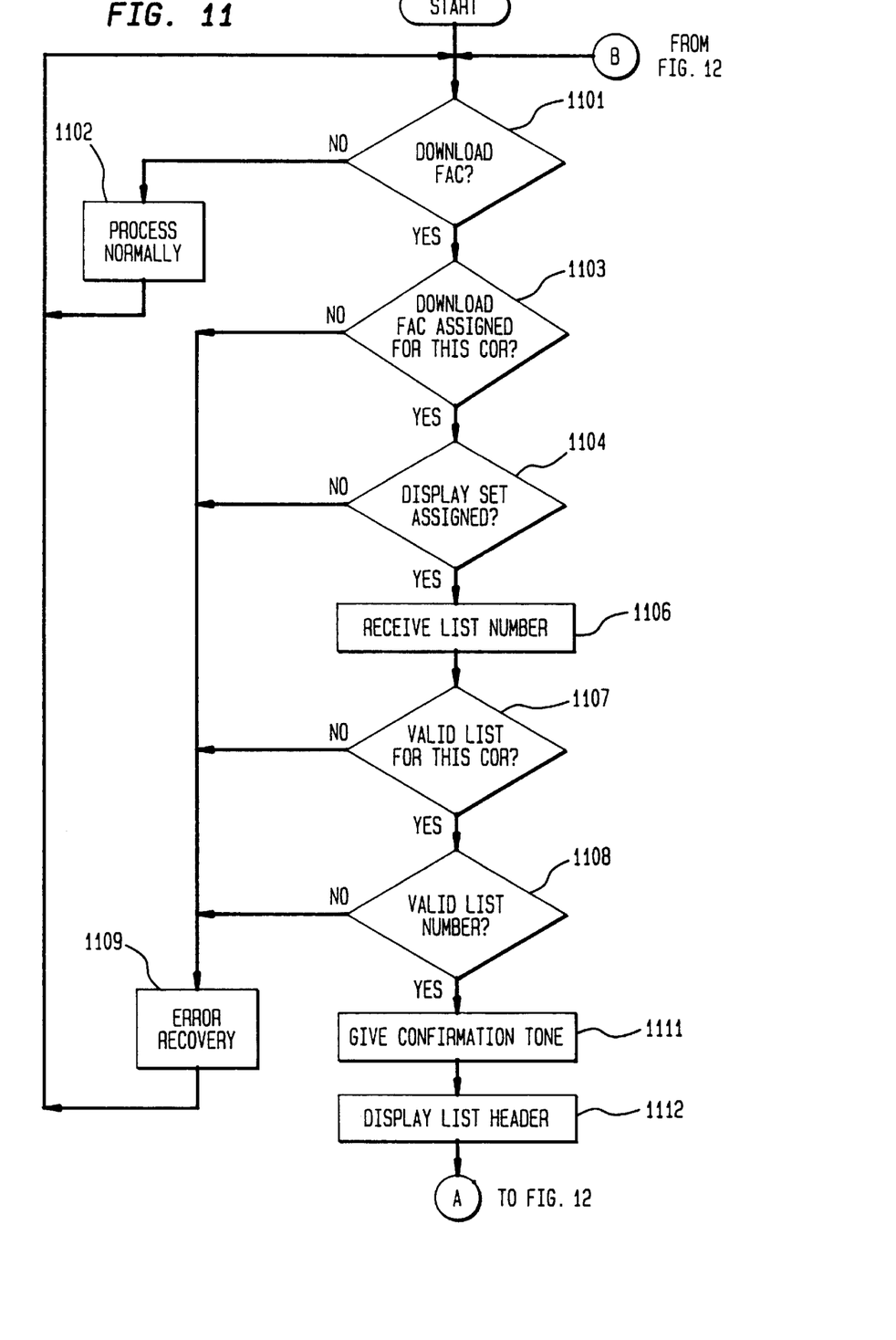
FIGS. 11 and 12 illustrate, in flow chart form, operations performed by a communication switching system in implementing a first embodiment of the invention.
Figure 12:
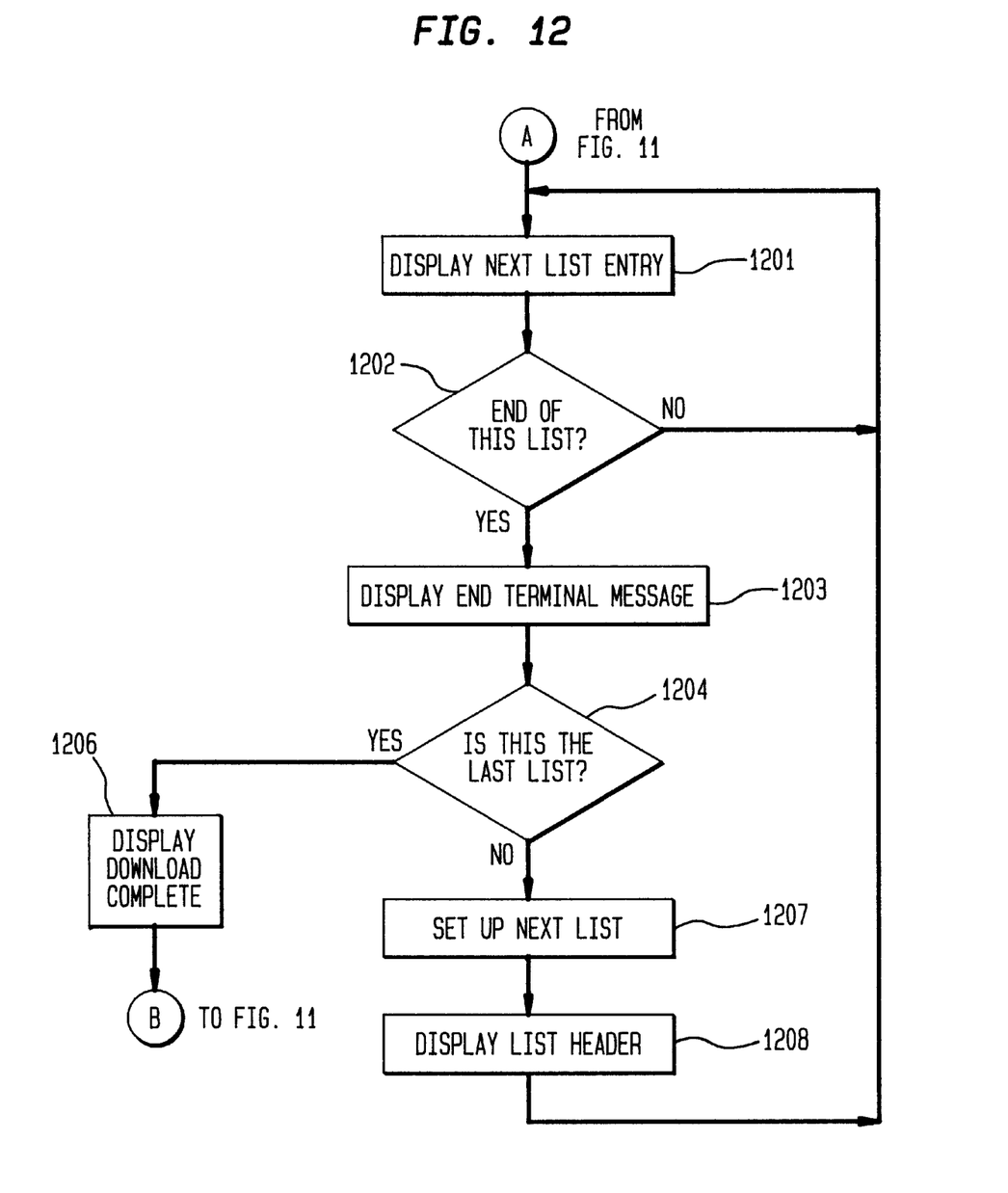

FIGS. 11 and 12 illustrate the steps performed by download code 152 of FIG. 1. Decision block 1101 determines if the download FAC has been invoked by a CTI terminal. If the answer is no, normal processing is done by block 1102 before control is returned to decision block 1101. If the answer is yes in decision block 1101, decision block 1103 determines if the download FAC has been assigned to this class of restriction (COR). If the answer is no, block 1109 performs error recovery before returning control to decision block 1101.

If the answer in decision block 1103 is yes, decision block 1104 determines if the CTI terminal requesting the list is administered as a display telephone set by communication switching system 100. If the answer is no, control is transferred to block 1109. If the answer is yes, block 1106 receives the list number of the administration information that is being requested. If a list number of "0" is received, then all four lists will be transmitted to the requesting CTI terminal.

After execution of block 1106, decision block 1107 determines if the requested list is valid for this COR. If the answer is no, block 1109 performs error recovery. If the answer is yes, block 1108 determines if the list number is a valid list number. If the answer is no, control is transferred to block 1109. If the list number is valid, block 1111 transmits a confirmation tone to the CTI terminal thus informing the terminal that the downloading will commence. After execution of block 1111, block 1112 then transmits the message illustrated in FIG. 2 and control is transferred to block 1201 of FIG. 12.

Block 1201 displays the next list entry to be transmitted to the CTI terminal. In the case of the first list entry, this will be the first entry of the list. Control is transferred to decision block 1202 which determines if all of the items in the list have been transmitted. If the answer is no, control is transferred back to block 1201. If the answer is yes in decision block 1202, control is transferred to block 1203 which transmits the message illustrated in FIG. 9. Next, decision block 1204 determines if the last list has been transmitted. There could have been four lists requested or a single list for transmission. If the answer in decision block 1204 is no, block 1207 sets up the next list for transmission, and block 1208 transmits the message illustrated in FIG. 2 for this next list before returning control to block 1201.

If the answer in decision block 1204 is yes, block 1206 transmits the message of FIG. 8 indicating that the download is complete before transferring control back to decision block 1101 of FIG. 11. Download code 152 transmits the abort message illustrated in FIG. 10 if the user attempts to utilize the CTI terminal in certain manners. This operation is not illustrated in FIGS. 11 and 12 but would be readily apparent to one skilled in the art.

Figure 13:
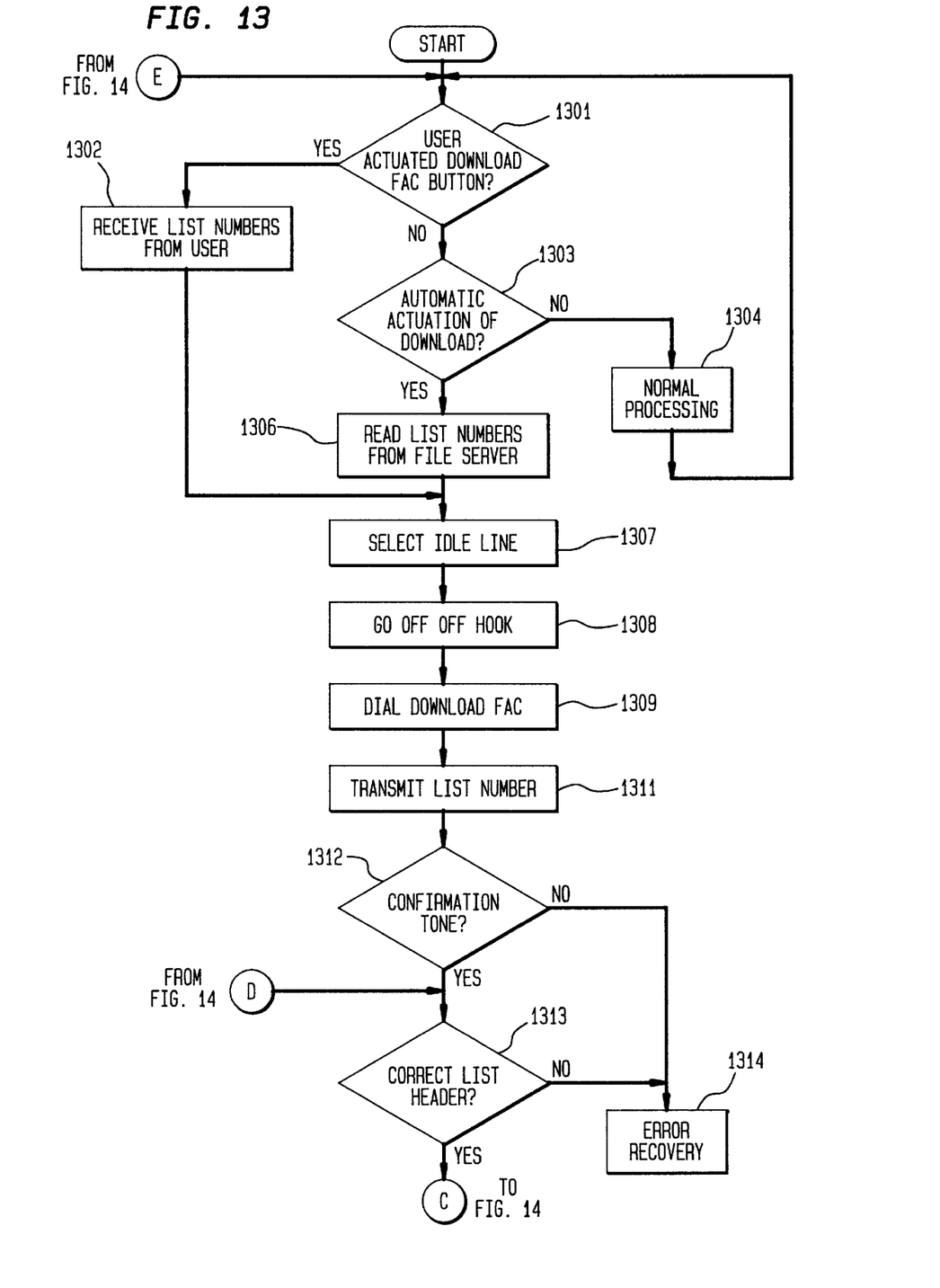
FIGS. 13 and 14 illustrate, in flow chart form, operations performed by a CTI terminal.
Figure 14:
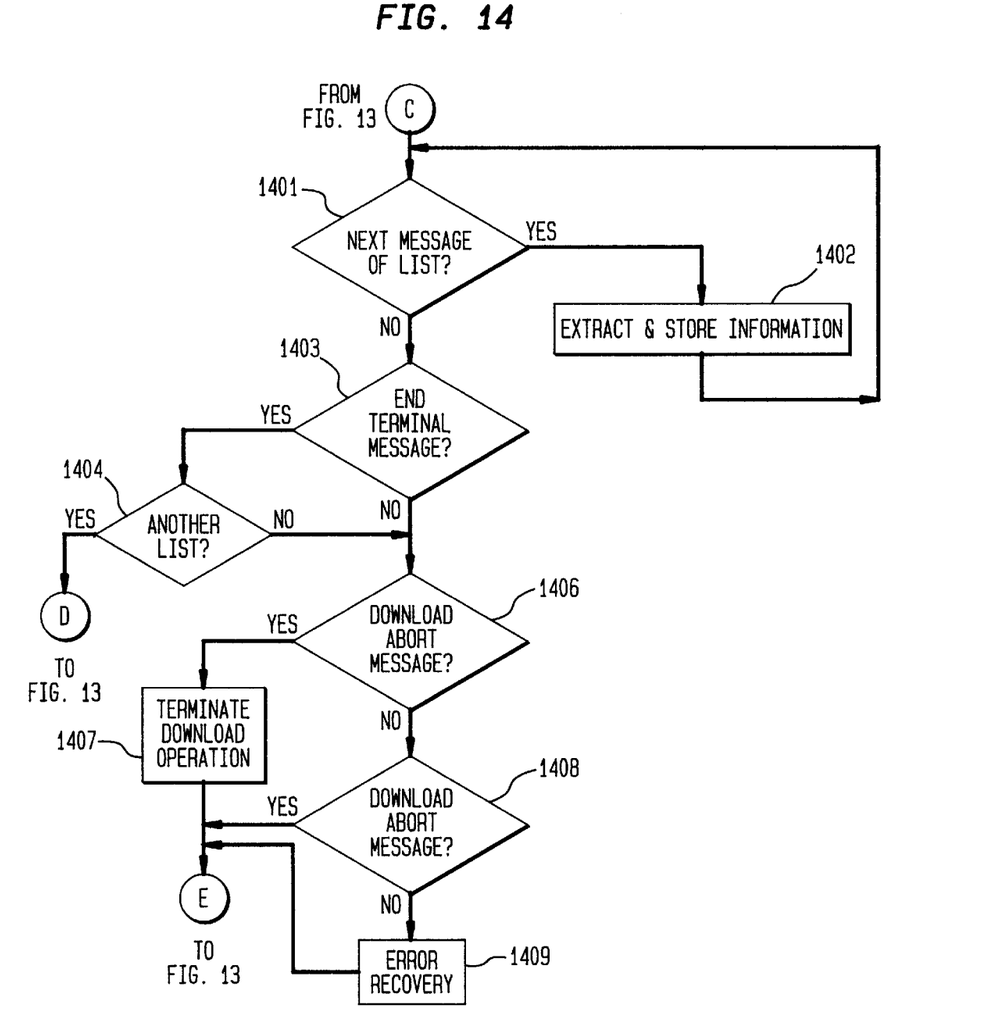

FIGS. 13 and 14 illustrate the operations performed by a CTI terminal in actuating the download FAC. The download FAC can be requested either by the user of the terminal actuating the download FAC button on the data terminal or by the system administrator requesting that the CTI terminal perform the download FAC by a message received via file server 122 of FIG. 1. The system administrator uses this capability when the administration information has changed for some or all of the CTI terminals. Decision block 1301 determines if the user of the terminal has actuated the download FAC button. If the answer is yes, block 1302 receives the list numbers being requested by the user. The user enters this information on the CTI terminal. After execution of block 1302, control is transferred to block 1307. If the answer in decision block 1301 is no, decision block 1303 determines if automatic actuation of the download is being requested via file server 122. If the answer is no, block 1304 does normal processing before returning control back to decision block 1301. If the answer in decision block 1303 is yes, block 1306 accesses a file on file server 122 to obtain the list numbers. These list numbers were placed there by a system administrator using well known techniques in the art.

After execution of blocks 1301 through 1306, block 1307 selects an idle line, and block 1308 goes off hook on that line. The download FAC number is then dialed using normal dialing messages by block 1309. Block 1311 then transmits the list number. Decision block 1312 determines if the confirmation tone is received back from communication switching system 100. If the answer is no, block 1314 performs error recovery. If the answer is yes, block 1313 determines if the correct message illustrated in FIG. 2 is received. If the answer is no, error recovery is performed by block 1314. If the answer is yes in decision block 1314, control is transferred to decision block 1401 of FIG. 14.

Decision block 1401 determines if the next message of the list has been received utilizing one of the formats illustrated in FIGS. 3 through 7. If the answer is yes, block 1402 extracts and stores the information from the message before returning control to block 1401. If the answer is no in decision block 1401, decision block 1403 determines if the message indicating the end of a list as illustrated in FIG. 9 was received. If the answer is yes, block 1404 determines if another list is going to be sent by communication switching system 100. If the answer is yes, control is transferred back to decision block 1313 of FIG. 13. If the answer is no in decision block 1404, control is transferred to block 1406 which determines if the download abort message illustrated in FIG. 10 has been received. If the answer is yes, block 1407 terminates the download operation and transfers control back to decision block 1301 of FIG. 13. If the answer in decision block 1406 is no, decision block 1408 determines if the download complete message as illustrated in FIG. 8 has been received. If the answer is yes, control is transferred back to decision block 1301 of FIG. 13. If the answer is no, control is transferred to block 1409 since an error has occurred in the transmission of a message.

Figure 16:
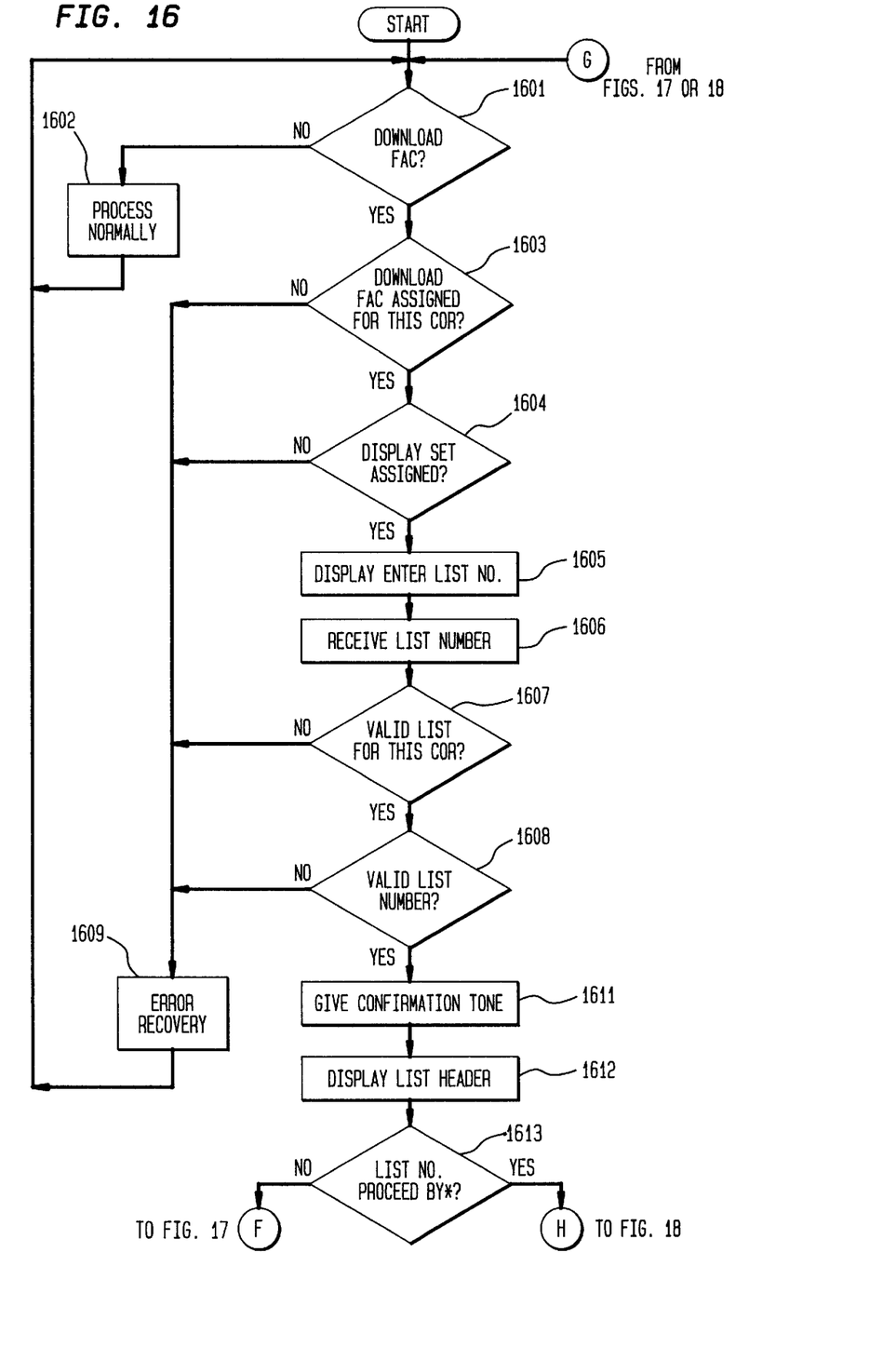
FIGS. 16–18 illustrate operations performed by a communication switching system in implementing a second embodiment of the invention.
Figure 17:
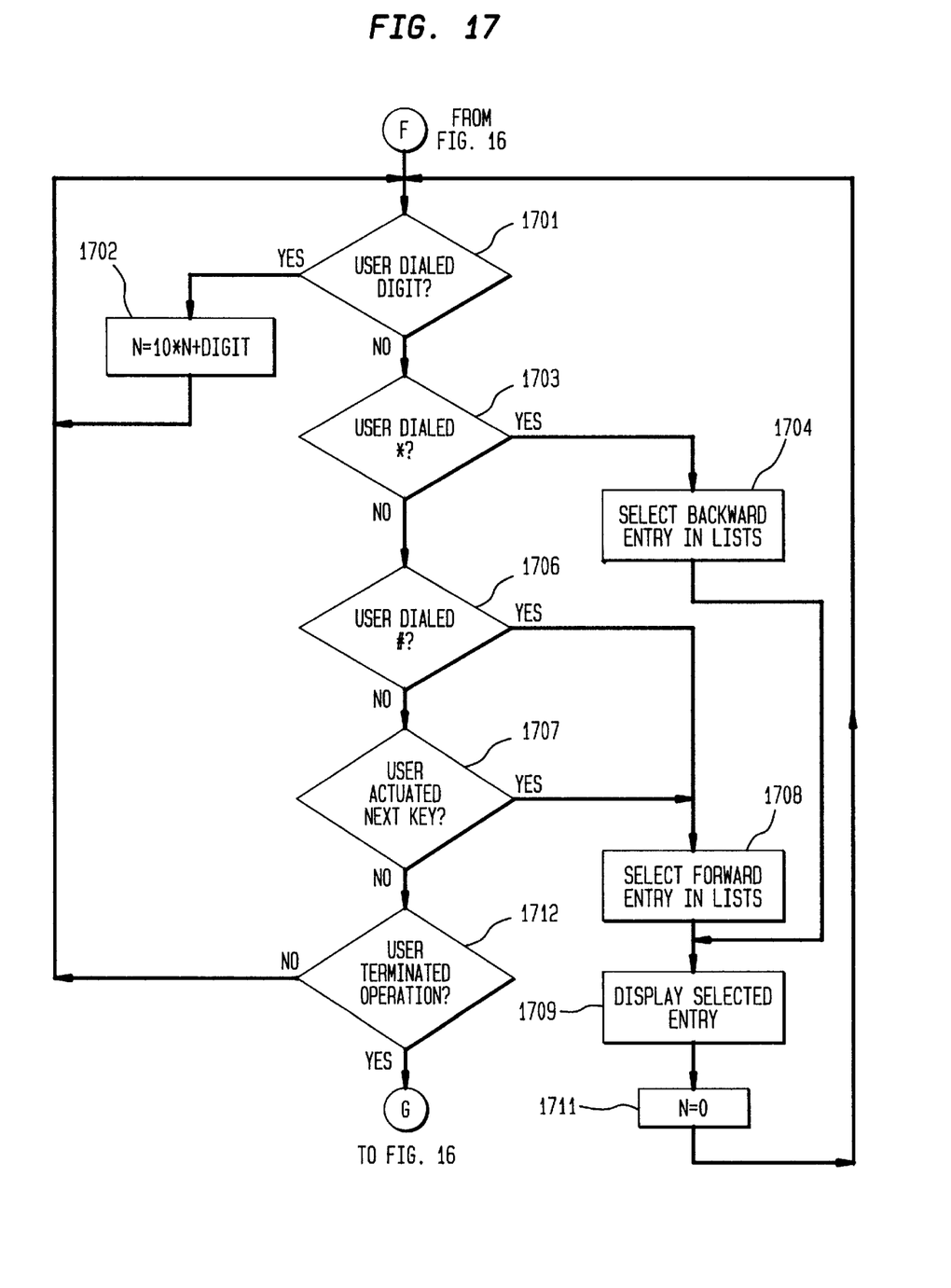
Figure 18:
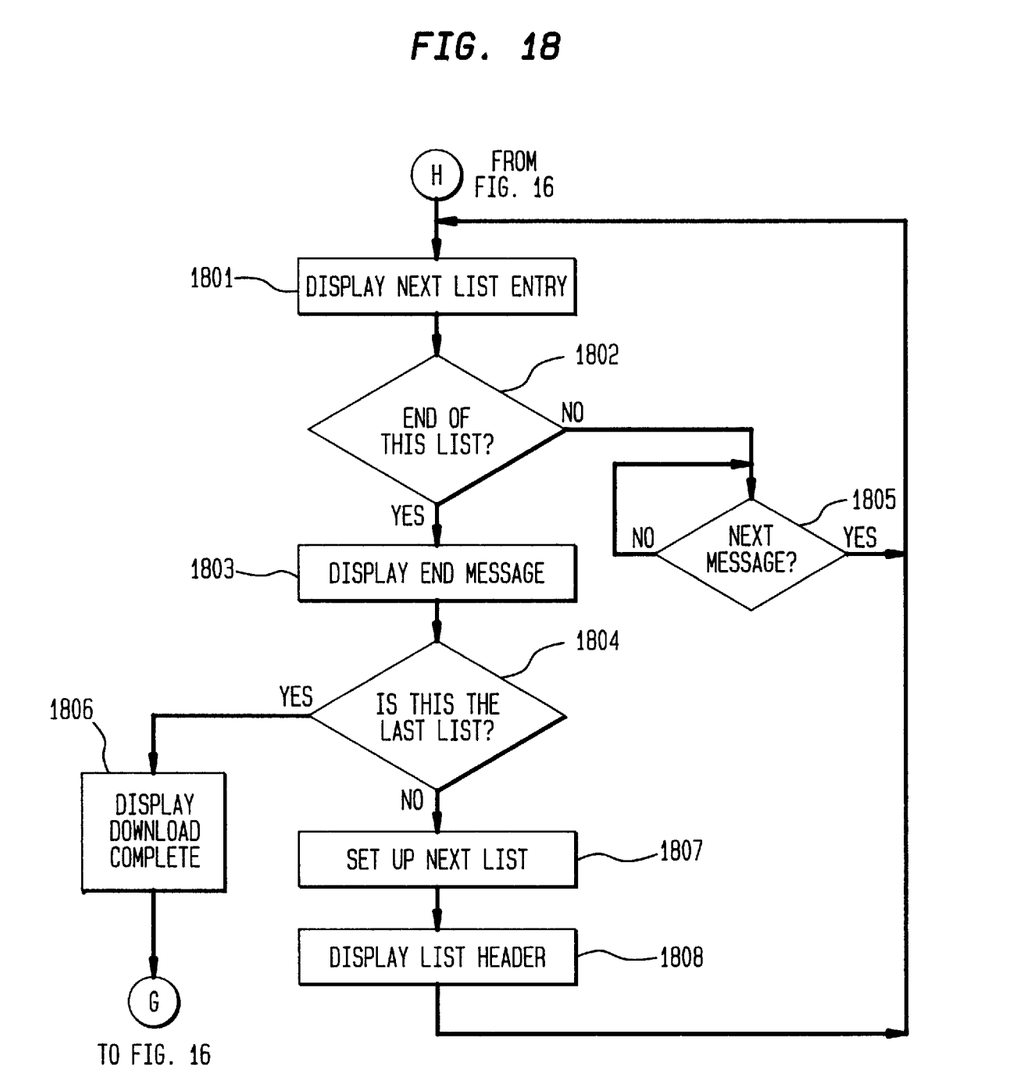

FIGS. 16, 17, and 18 illustrate the steps performed by download code 152 of FIG. 1 in an second embodiment of the invention. In the second embodiment of the invention, the user of a display terminal is given the capability of displaying the lists or portions of the lists on the display of the display terminal. In particular, FIG. 17 illustrates the operations performed in response to input from the user of the display terminal. The operations performed by the user will be described in greater detail with respect to FIG. 17. The operations performed by a CTI terminal in using the download FAC remain similar to those already described with the exception that the CTI terminal now proceeds the desired list number with a "*". Decision block 1601 determines if the download FAC has been invoked by a CTI terminal. If the answer is no, normal processing is done by block 1602 before control is returned to decision block 1601. If the answer is yes in decision block 1601, decision block 1603 determines if the download FAC has been assigned to this class of restriction (COR). If the answer is no, block 1609 performs error recovery before returning control to decision block 1601.

Figure 15:
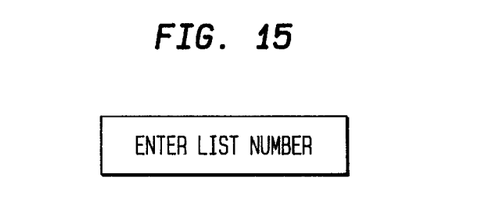
FIG. 15 illustrates a message transmitted by a communication switching system.

If the answer in decision block 1603 is yes, decision block 1604 determines if the CTI terminal requesting the list is administered as a display telephone set by communication switching system 100. If the answer is no, control is transferred to block 1609. If the answer is yes, block 1605 displays the message illustrated in FIG. 15 requesting the list number, and block 1606 receives the list number of the administration information that is being requested. If a list number of "0" is received, then all four lists will be transmitted to the requesting CTI terminal.

After execution of block 1606, decision block 1607 determines if the requested list is valid for this COR. If the answer is no, block 1609 performs error recovery. If the answer is yes, block 1608 determines if the list number is a valid list number. If the answer is no, control is transferred to block 1609. If the list number is valid, block 1611 transmits a confirmation tone to the CTI terminal thus informing the terminal that the downloading will commence. After execution of block 1611, block 1612 then transmits the message illustrated in FIG. 2 and control is transferred to decision block 1613. Decision block 1613 determines if the list number is proceeded by a "*". If the list number is proceeded by a "*", it means that the download is being requested by a CTI terminal. In this case, control is transferred to block 1801 of FIG. 18. If the list number is not proceeded by a "*", then a user of a display terminal is requesting the list be displayed on the display of the display terminal. In this case, control is transferred to decision block 1701 of FIG. 17.

As illustrated in FIG. 17, the user can dial a number having multiple digits which will be used to move backward or forward in the list or can also cause a jump to another list. Decision block 1701 determines if the user has dialed a digit. If the answer is yes, 1702 assembles this digit into a multiple digit number if a previous digit had been dialed. After execution of block 1702, control is transferred back to decision block 1701. If the answer in decision block 1701 is no, control is transferred to decision block 1703 to determine if the user dialed a "*". If the answer is yes, this means that the user wants to have previous entries displayed. Block 1704 determines which entry should be moved backward by utilizing the table illustrated in FIG. 19. Since the user dialed an *, the operation performed is that illustrated in column 1903. If a list header is currently being selected, the previous list header will be selected and that list selected for subsequent operations as illustrated in entry 1904. If the first entry of a list is currently selected as illustrated in line 1906, the list header of the current list will be selected. If the current entry selected is within the top end of a list as illustrated in line 1907, then the first entry of the current list will be selected. If the conditions illustrated in lines 1908–1911 are present then the Nth entry from the current entry is selected where "N" is the number assembled by block 1702. Finally, if the message "NO MORE" is currently selected indicating that there are no more entries in this list as illustrated in line 1910, then the Nth entry from the last entry of the list is selected. After block 1708 has selected the entry to be displayed, control is transferred to block 1709 which displays the selected entry. Block 1711 then sets N equal to zero and returns control to decision block 1701.

Decision block 1706 determines if the user has dialed a "#", and decision block 1707 determines if the user has actuated the "NEXT" key on the display terminal. If the answer in either decision block 1706 or 1707 is yes, block 1708 is selected which determines the forward selection as illustrated in column 1902 of FIG. 19. If the entry currently selected as defined in column 1901 is that for lines 1904–1908, then the Nth entry from the currently selected entry is selected. If the condition is that the currently selected entry is within the bottom end of the list as illustrated in line 1909, then the last entry of the table is selected. If the last entry is currently selected as illustrated in line 1911, then the message "NO MORE" is selected for display on the display terminal. If the "NO MORE" is currently being selected as illustrated in line 1910, then the next list header is selected. After execution of block 1708, control is transferred to block 1709 whose operations were previously described.

If the answer in decision block 1707 is no, control is transferred to decision block 1712 which determines if the user has terminated the operation. A terminating operation is that the user has disconnected from the current call which has been set up to actuate the download feature or has placed another call. One skilled in the art could readily see that other operations by the user could also terminate the display of administration data.

Block 1801 displays the next list entry to be transmitted to the CTI terminal. In the case of the first list entry, this will be the first entry of the list. Control is transferred to decision block 1802 which determines if all of the items in the list have been transmitted. If the answer is no, control is transferred to block 1805 which waits until a message indicating actuation of the "NEXT" key is received. In the second embodiment, block 1402 of FIG. 14 must be modified so that the CTI transmits the NEXT message. If the answer is yes in decision block 1802, control is transferred to block 1803 which transmits the message illustrated in FIG. 9. Next, decision block 1804 determines if the last list has been transmitted. There could have been four lists requested or a single list for transmission. If the answer in decision block 1804 is no, block 1807 sets up the next list for transmission, and block 1808 transmits the message illustrated in FIG. 2 for this next list before returning control to block 1801.

Figure 19:
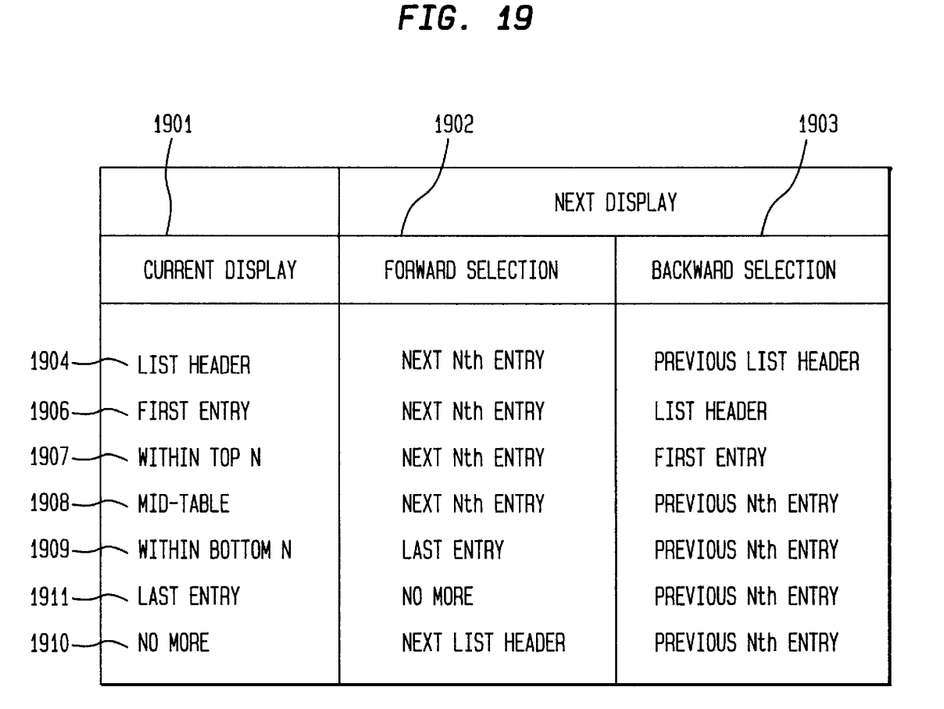
FIG. 19 illustrates a table setting forth operations performed by a communication switching system in response to user inputs.

If the answer in decision block 1804 is yes, block 1806 transmits the message of FIG. 8 indicating that the download is complete before transferring control back to decision block 1601 of FIG. 16. Download code 152 transmits the abort message illustrated in FIG. 10 if the user attempts to utilize the CTI terminal in certain manners. FIGS. 17, 18, and 19 detail one embodiment for allowing a user to access the administration information. One skilled in the art could readily envision other embodiments.

The invention claimed is:

1. A telecommunication system comprising:
   a plurality of user telecommunication terminals each having a display;
   a plurality telecommunication links each connected to a different one of the plurality of user telecommunication terminals;
   a telephone switching system connected to the plurality of telecommunication links for connecting telephone calls to or from the plurality of user telecommunication terminals via the plurality of telecommunication links;
   means in telephone switching system responsive to a feature actuation message received from one of the plurality of user telecommunication terminals via one of the plurality of telecommunication links for down loading administration information as display messages to the one of the plurality of user telecommunication terminals via the one of the plurality of telecommunication links where the administration information comprises system parameters, switch feature access codes, terminal button assignments, and display formats; and
   means in the one of the plurality of user telecommunication terminals for storing the administration information to control internal operations of the one of the plurality of user telecommunication terminals for interactions with the telephone switching system.

2. The telecommunication system of claim 1 comprises a call center;
   the plurality of user telecommunication terminals comprises call center agents' terminals; and
   the telephone switching system comprises an automatic call distribution system.

3. The telecommunication system of claim 1 wherein the administration information comprises a plurality of items and the means for down loading comprises means for receiving a message defining a requested one of the plurality of items; and
   means for transmitting the requested one of the plurality of items via the one of the plurality of telecommunication links.

4. The telecommunication system of claim 3 wherein the means for receiving comprises means for detecting if the received message is requesting a valid one of the plurality of items; and
   means for signaling via the one of the plurality of telecommunication links upon the received message requesting a valid one of the plurality of items.

5. The telecommunication system of claim 4 wherein the one of the plurality of user telecommunication terminals comprises computer means for transmitting the feature actuation message via the one of plurality of communication links; and
   the computer means comprises means for receiving the display messages.

6. The telecommunication system of claim 5 wherein the means for receiving the display messages comprises means for extracting the administration information from the display messages.

7. The telecommunication system of claim 6 wherein the computer means responsive to an action of a user of the one of the plurality of user telecommunication terminals.

8. The telecommunication system of claim 7 comprises a call center;
   the plurality of user telecommunication terminals comprises call center agents' terminals; and
   the telephone switching system comprises an automatic call distribution system.

9. The telecommunication system of claim 4 wherein one of the plurality of user telecommunication terminals is a display telephone and the means for downloading further comprises means for receiving control messages from the display telephone; and
   means responsive to each of the control messages for transmitting a unit of administration information of the plurality of items to the display telephone.

10. The telecommunication system of claim 1 wherein the one of the plurality of user telecommunication terminals further comprises means for transmitting the feature actuation message in response to a stimulus from a system administrator of the telecommunication system received via a file server.

11. The telecommunication system of claim 10 comprises a call center;
    the plurality of user telecommunication terminals comprises call center agents' terminals; and
    the telephone switching system comprises an automatic call distribution system.

12. A method for down loading administration information from a telephone switching system to a plurality of user telecommunication terminals via a plurality of telecommunication links with each of the plurality telecommunication links interconnecting an individual one of plurality of user telecommunication terminals to the telephone switching system, comprising the steps of:
    connecting telephone calls to and from the user telecommunication terminals by the telephone switching system via the plurality of telecommunication links;
    transmitting feature actuation messages to the telephone switching system by one of the plurality of user telecommunication terminals via one of the plurality of telecommunication links;
    accessing the administration information of the one of the plurality of user telecommunication terminals by the telephone switching system in response to the feature actuation messages from the one of the plurality of user telecommunication terminals where the administration information comprises system parameters, switch feature access codes, terminal button assignments, and display formats;

transmitting the accessed administration information as display messages to the one of plurality of user telecommunication terminals via the one of plurality of telecommunication links by telephone switching system; and storing by the one of the plurality of user telecommunication terminals the administration information to control internal operations of the one of the plurality of user telecommunication terminals for interactions with the telephone switching system.

13. The method of claim 12 wherein the plurality of user telecommunication terminals comprises call center agents' terminals; and the telephone switching system comprises an automatic call distribution system.

14. The method of claim 12 wherein the administration information comprises a plurality of items and one of the feature actuation messages defines a requested one of the plurality of items; and the step of accessing comprises the step of selecting the requested one of the plurality of items for transmission via the one of the plurality of telecommunication links.

15. The method of claim 14 wherein the step of accessing further comprises the steps of detecting if the one of the feature actuation messages is requesting a valid one of the plurality of items; and signaling via the one of the plurality of telecommunication links upon the one of feature actuation messages requesting a valid one of the plurality of items.

16. The method of claim 15 wherein one of the plurality of user telecommunication terminals comprises a computer that transmits the feature actuation messages via the one of plurality of communication links and receives the display messages.

17. The method of claim 16 wherein the plurality of user telecommunication terminals comprises call center agents' terminals; and the telephone switching system comprises an automatic call distribution system.

18. The telecommunication system of claim 15 wherein one of the plurality of user telecommunication terminals is a display telephone and the step of selecting further comprises the steps of receiving control messages from the display telephone; and selecting in response to each of the control messages a unit of administration information of the plurality of items for transmission to the display telephone.

19. The method of claim 18 wherein the plurality of user telecommunication terminals comprises call center agents' terminals; and the telephone switching system comprises an automatic call distribution system.

20. The method of claim 12 further comprises the step of transmitting the feature actuation message by the one of the plurality of user telecommunication terminals in response to a stimulus from a system administrator of the telecommunication system received via a file server.

* * * * *